(12) United States Patent
Shinozaki

(10) Patent No.: US 8,770,044 B2
(45) Date of Patent: Jul. 8, 2014

(54) LOAD DETECTION SENSOR

(75) Inventor: Naoya Shinozaki, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 308 days.

(21) Appl. No.: 13/376,329

(22) PCT Filed: Jun. 23, 2010

(86) PCT No.: PCT/JP2010/060668
§ 371 (c)(1),
(2), (4) Date: Dec. 16, 2011

(87) PCT Pub. No.: WO2011/001876
PCT Pub. Date: Jan. 6, 2011

(65) Prior Publication Data
US 2012/0073387 A1 Mar. 29, 2012

(30) Foreign Application Priority Data

Jun. 30, 2009 (JP) ................. 2009-155213

(51) Int. Cl.
*G01L 1/10* (2006.01)

(52) U.S. Cl.
USPC ...................................................... 73/862.59

(58) Field of Classification Search
USPC ...................................................... 73/862.59
See application file for complete search history.

(56) References Cited

U.S. PATENT DOCUMENTS

| | | | |
|---|---|---|---|
| 4,799,561 A | | 1/1989 | Komoto |
| 4,881,607 A | * | 11/1989 | Backu .......................... 177/256 |
| 5,313,023 A | * | 5/1994 | Johnson ........................ 177/229 |
| 5,481,072 A | | 1/1996 | Ford |
| 6,194,672 B1 | * | 2/2001 | Burkhard et al. ...... 177/210 EM |
| 6,365,847 B1 | * | 4/2002 | Muller et al. .......... 177/210 EM |
| 6,693,245 B2 | * | 2/2004 | Watabiki et al. ....... 177/210 EM |

(Continued)

FOREIGN PATENT DOCUMENTS

| | | |
|---|---|---|
| JP | 63-277936 A | 11/1988 |
| JP | 2004-239827 A | 8/2004 |
| JP | 2006-208045 A | 8/2006 |
| JP | 2009-121949 A | 6/2009 |

OTHER PUBLICATIONS

International Search Report of PCT/JP2010/060668, mailing date Jul. 20, 2010.

*Primary Examiner* — Freddie Kirkland, III

(74) *Attorney, Agent, or Firm* — Westerman, Hattori, Daniels & Adrian, LLP

(57) ABSTRACT

A load detection sensor capable of stably weighing a heavy object to be weighed in high precision. The load detection sensor according to the present invention includes a force sensor including a tuning fork vibrator and a block body that has a rectangular parallelepiped outer shape and transmits an applied load to the force sensor by using a lever to reduce the load. It is characterized in that the block body contains therein a lever mechanism and a Roberval mechanism by working on the longitudinal side thereof and that the force sensor is coupled to the side of the block body. Although the block body is cut and ground in the side for fabricating the lever mechanism and the Roberval mechanism, it maintains the rectangular parallelepiped outer shape and sufficient mechanical strength, thereby enabling to stably reduce the applied load.

2 Claims, 13 Drawing Sheets

(56) References Cited

U.S. PATENT DOCUMENTS

| | | | |
|---|---|---|---|
| 6,787,714 B2 * | 9/2004 | Iiduka | 177/212 |
| 6,880,407 B2 * | 4/2005 | Yamanaka et al. | 73/778 |
| 7,091,428 B2 * | 8/2006 | Ikeshima | 177/229 |
| 7,534,971 B2 * | 5/2009 | Kuhlmann et al. | 177/210 EM |
| 7,612,304 B2 * | 11/2009 | Kobayashi et al. | 177/229 |
| 8,232,484 B2 * | 7/2012 | Hauck | 177/210 EM |
| 2005/0139016 A1 * | 6/2005 | Yamanaka et al. | 73/862.59 |
| 2005/0284670 A1 * | 12/2005 | Ikeshima | 177/229 |

* cited by examiner

LOAD DETECTION SENSOR

FIELD OF INVENTION

The present invention relates to a load detection sensor for use in a platform scale or the like, and is directed to such load detection sensor to enable high precision weighing.

BACKGROUND ART

Electronic scales can be classified primarily into a load cell type using a strain gauge, a tuning fork vibration type using a tuning fork vibrator and an electromagnetic balancing type using an electromagnet and an electromagnetic coil.

The load cell type makes weight measurements based on the amount of transformation of the strain gauge by a load of an object to be weighed. As disclosed in the following Patent Document 1, the timing fork vibration type makes weight measurements using the fact that vibration frequency of the tuning fork varies in proportion to the load to be applied between both ends of the tuning fork. On the other hand, the electromagnet balancing type breaks the balanced condition of a mechanical balance mechanism and recovers the balanced condition by flowing electric current through the electromagnetic coil, thereby determining the weight of the load based on the amplitude of the electric current.

As far as precision of these scales is concerned, the tuning fork vibrator type and the electromagnetic balancing type are higher than the load cell type. On the other hand, in the manufacturing cost of these scales, the electromagnetic balancing type is the highest because of its complex construction and the load cell type is the lowest because of its simple construction.

Currently, most of platform scales having a weighing range (measurement range) up to 300 kg are the load cell type.

PRIOR ART

Patent Document

Patent Document 1: JP2004-239827 A

SUMMARY OF THE INVENTION

Problem to be Solved by the Invention

However, there are increasing needs in production fields for measuring weight of heavy objects to be measured in high precision for cases such as, for example, weighing raw bath and the like contained. This is the reason why it is necessary to improve measurement precision of platform scales.

Precision improvement of a platform scale cannot be achieved by simply employing a higher precision weighing type. It is also necessary to assure mechanical strength to tolerate a heavy object. There is a need for providing a load detection sensor capable of stably weighing even if an applied load is large.

Additionally, it is necessary to reduce the height of a weighing table of a platform scale for ease of loading and unloading operations of a heavy object on the weighing table of such platform scale.

The present invention was made in consideration of these circumstances into consideration and it is an object of the present invention to provide a load detection sensor capable of accurately and stably measuring weight of a heavy object.

Means to Solve the Problem

The load detection sensor according to the present invention comprises a force sensor including a tuning fork vibrator and a block body having a rectangular parallelepiped outer shape and transmitting an applied load to the force sensor after reducing the force by a lever. It is characterized in that the block body contains a lever mechanism and a Roberval mechanism worked in the longitudinal side and that the force sensor is coupled to the side of the block body.

Although the block body is cut and ground from the side thereof for incorporating the lever mechanism and the Roberval mechanism, it maintains generally rectangular parallelepiped outer shape to provide sufficient mechanical strength, thereby ensuring stable reduction operation of the applied load. Additionally, since the force sensor is coupled to the side of the block body, the force sensor does not increase the height of the load sensor. This is effective in order to reduce the height of the weighing table of the platform scale.

Moreover, in the load detection sensor according to the present invention, a coupling member for joining to a force point of the lever inside the block body is formed near the center portion in the width direction of the block body by cutting from both opposed sides of the block body.

Provision of the coupling member joining to the force point of the lever only near the center portion in the width direction of the block body enables to eliminate any effect of twisting upon the force sensor even if the block body may be twisted by the load of the object to be weighed.

Advantages of the Invention

The load detection sensor according to the present invention ensures stable weighing in high precision.

Also, by implementing a platform scale using such load detection sensor, it is possible to reduce the height of the weighing table of the platform scale.

EMBODIMENTS TO IMPLEMENT THE INVENTION

Figure 10:
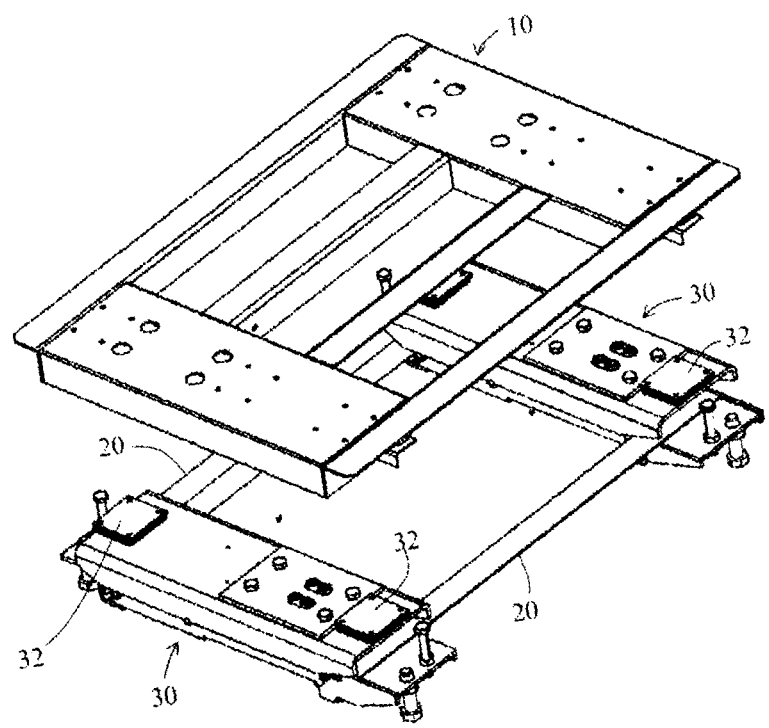
FIG. 10 is an exploded perspective view of a platform scale using the load detection sensor as shown in FIG. 1.

FIG. 10 shows an example of a platform scale that is implemented by using the load detection sensor according to the present invention.

The platform scale comprises an upper frame 10 for supporting a weighing table (not shown), a pair of base frames 20, 20 and one or more load detection unit 30 bridging between the base frames 20, 20, wherein the upper frame 10 is placed over the load detection unit 30.

Figure 11:
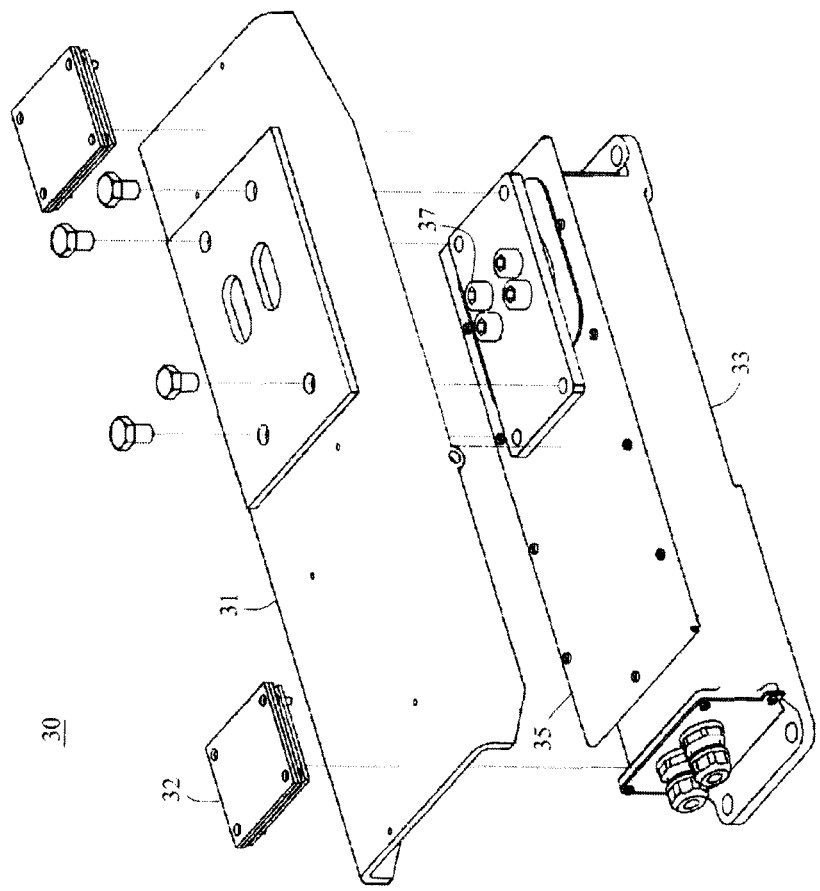
FIG. 11 is an exploded perspective view of a load detection unit that uses the load detection sensor as shown in FIG. 1.

As shown in FIG. 11, each load detection unit 30 comprises an upper support member 31 for supporting the upper frame 10 and a sensor case 33 for accommodating the load detection sensor and a circuit board.

Figure 12:
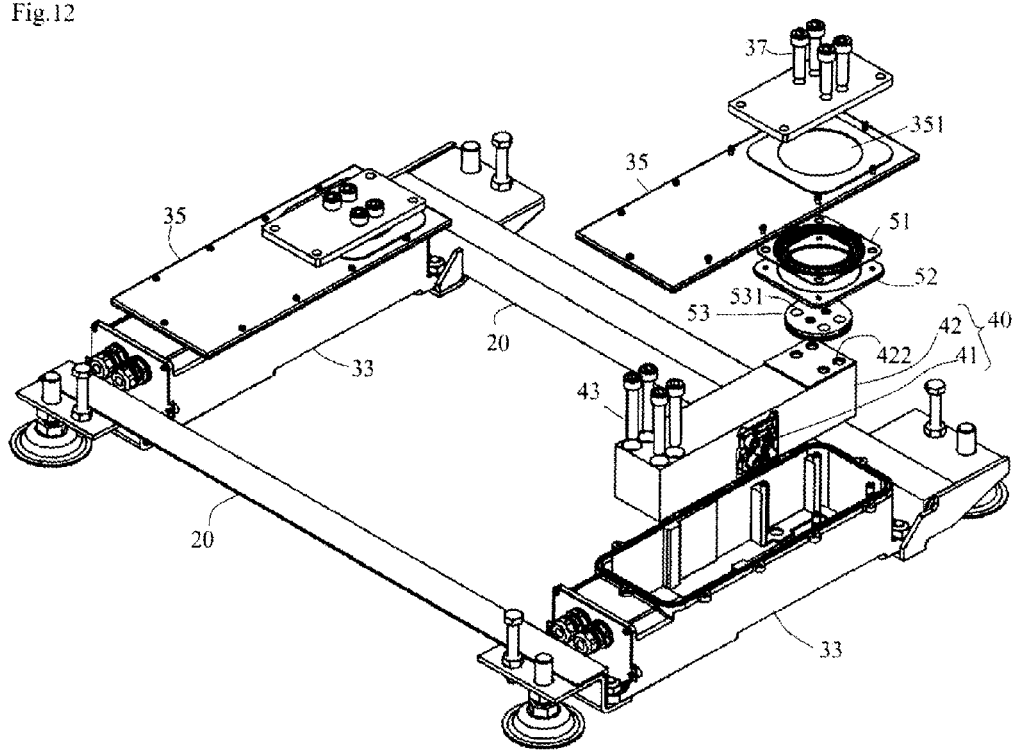
FIG. 12 is an exploded perspective view of a sensor case of the platform scale that uses the load detection sensor as shown in FIG. 1.

FIG. 12 is an exploded perspective view to illustrate internal components of the sensor case 33.

The sensor case 33 accommodates a load detection sensor 40 that comprises a force sensor 41 including a tuning fork vibrator and a block body 42 made of aluminum alloy. A fixed end of the block body 42 is securely mounted on the bottom of the sensor case 33 by bolts 43, while load transmitting bolts 37 are securely mounted on a movable end of the block body 42.

An opening of the sensor case 33 that accommodates the load detection sensor 40 is covered with a cover 35. Air spaces between the bolts 37 inserted into hole 351 in the cover 35 and the hole 351 are sealed by a sealing mechanism that comprises a diaphragm 51, a clamping plate 53 for sandwiching the circumferential edge of the circle of the diaphragm 51 by using a pair of circular plates and a mounting plate 52 for securely mounting the outer periphery of the diaphragm 51 on the rear surface of the cover 35.

The clamping plate 53 is formed with the hole 351 that tightly mates with bolts 37. The front ends of the bolts 37 extending through the hole 351 are mated with screw holes 422 at the movable end of the block body 42.

As a result, in the platform scale, a load applied onto the upper frame 10 is transmitted to the upper support member 31 of the pair of load detection units 30 that are in contact with the upper frame 10. The load is then transmitted to the bolts 37 that support the upper support member 31, thereby transforming the movable end of the block body 42 that constitutes the load detection sensor 40 by the load applied to the bolts 37. A signal in response to the transformation is outputted from the tuning fork vibrator of the force sensor 41. The signal is then converted into a digital signal by a circuit on a circuit board that is accommodated in the sensor case 33. The digital signals outputted from the load detection units 30 are added to each other for displaying the weight of the object to be weighed on a display (not shown).

It is to be noted that component force damping devices 32 are interposed between the upper frame 10 and the upper support member 31 for releasing a horizontal component force that acts on the upper support member 31 from the upper frame 10.

Figure 1:
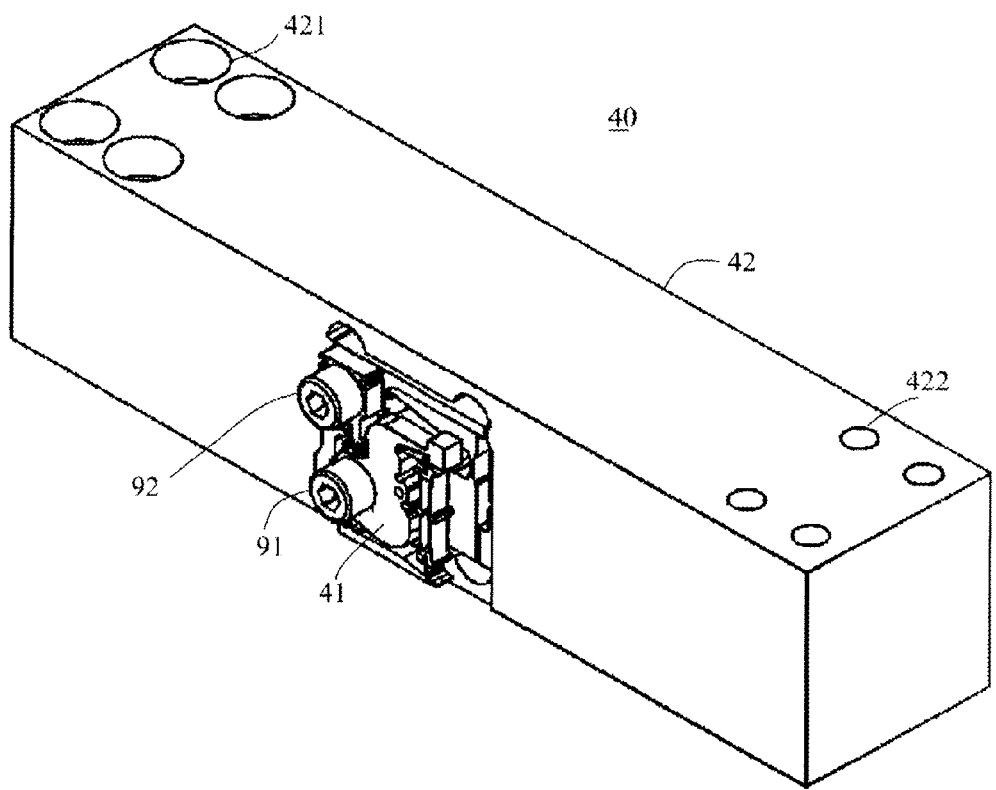
FIG. 1 is a perspective view of an embodiment of the load detection sensor according to the present invention.
Figure 2:
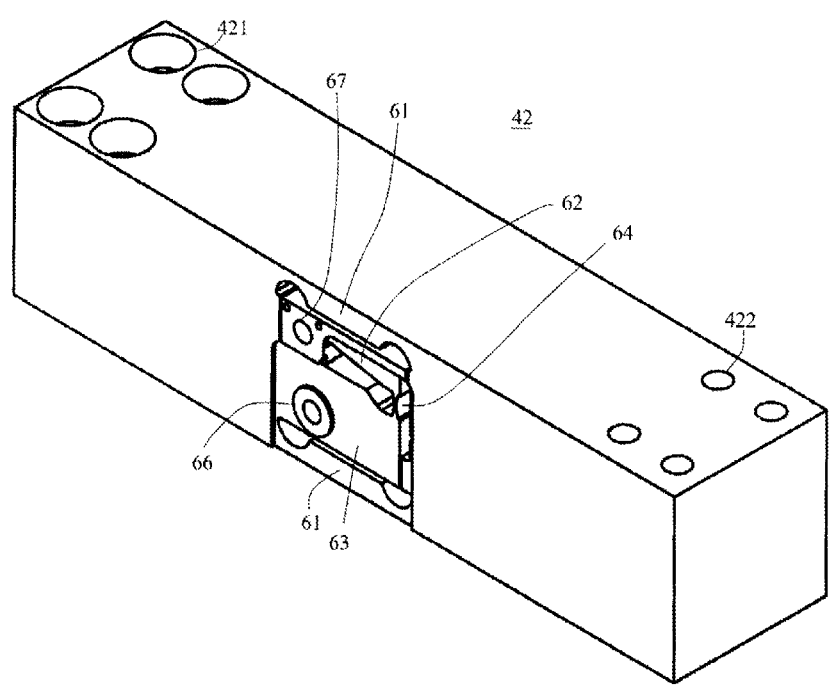
FIG. 2 is a perspective view of a block body in the load detection sensor as shown in FIG. 1.
Figure 8:
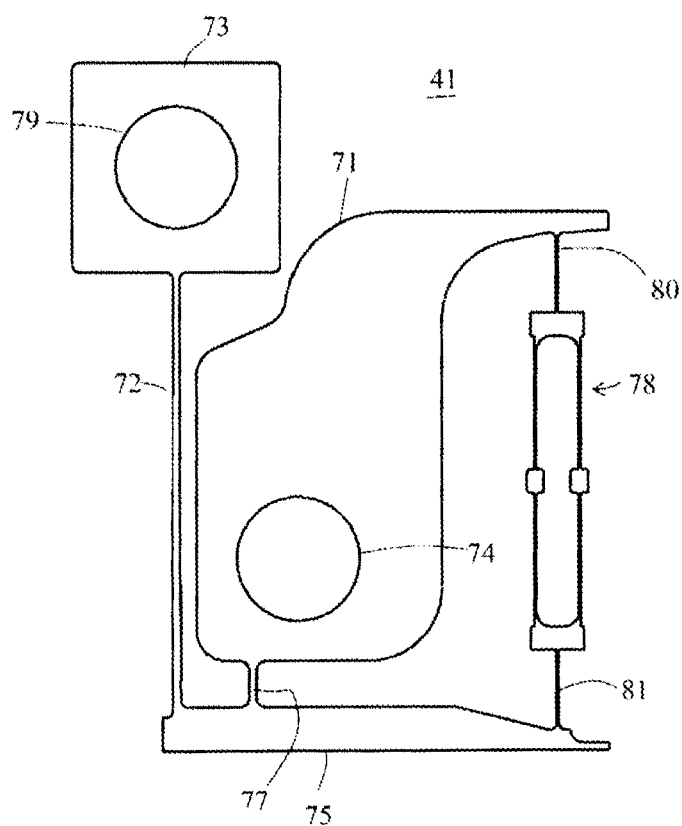
FIG. 8 is a plan view of a force sensor in the load detection sensor as shown in FIG. 1.
Figure 9:
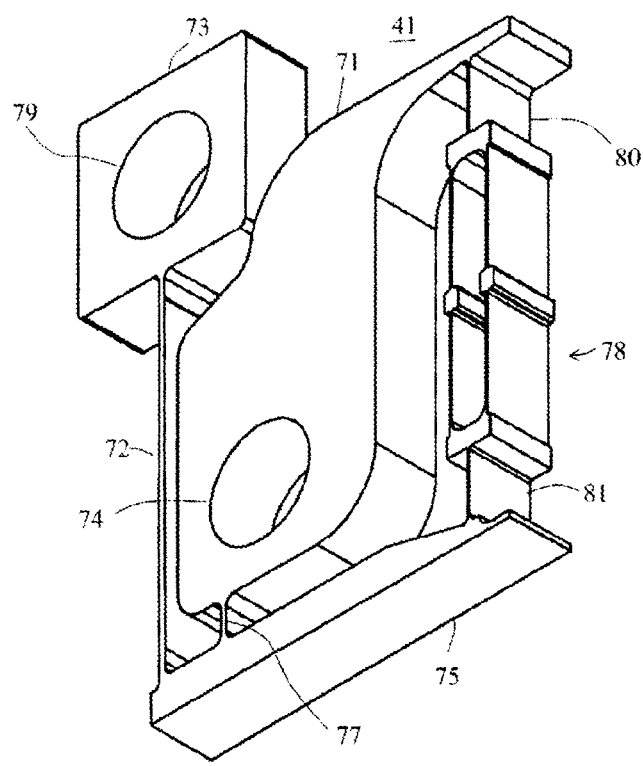
FIG. 9 is a perspective view of the force sensor as shown in FIG. 8.

FIG. 1 shows an embodiment of the load detection sensor 40 that comprises the force sensor 41 coupled to a side of the block body 42. On the other hand, FIG. 2 shows the block body 42 from which the force sensor 41 is removed. FIGS. 8 and 9 show the removed force sensor 41. FIG. 8 is a plan view of the force sensor 41 and FIG. 9 is a perspective view of the force sensor 41.

The block body 42 has a rectangular parallelepiped outer shape made of aluminum alloy. The block body 42 is formed in the upper face thereof with bolt holes 421 into which bolts 43 are inserted and screw holes 422 for mating with the bolts 37. A cut-out and ground section is worked in the longitudinal side for implementing a lever mechanism and a Roberval mechanism at an inner central section of the block body 42.

Figure 3:
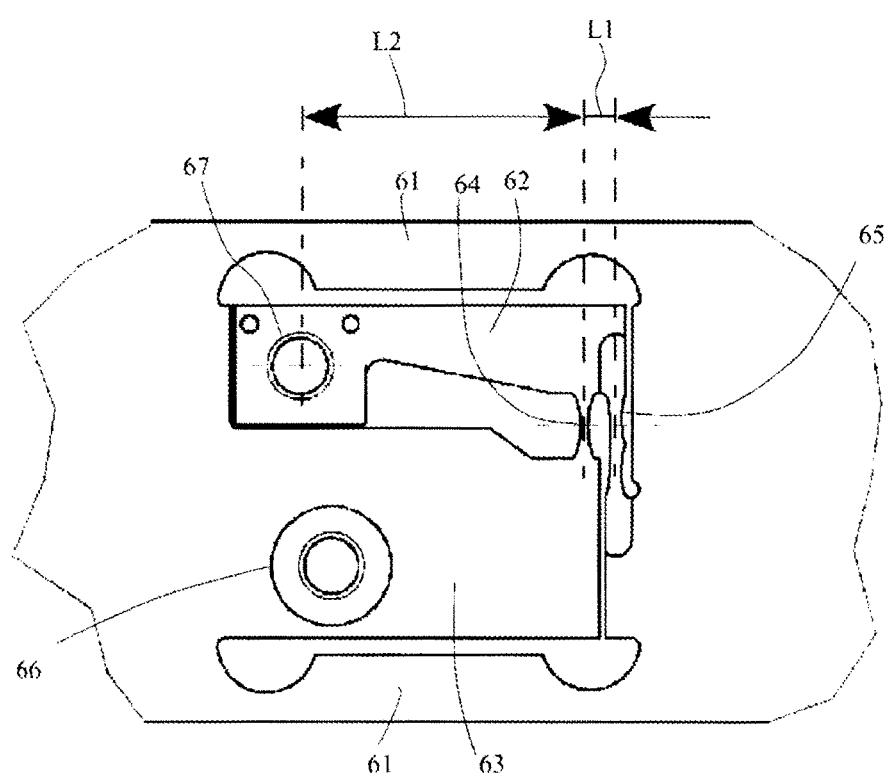
FIG. 3 is a plan view to illustrate a worked section of the block body as shown in FIG. 2.

FIG. 3 is a plan view of the block body 42 at the worked section. Formed by the work on the block body 42 are parallel ring sections 61 for constituting the Roberval mechanism, a lever section 62 for constituting the lever mechanism, a fixed section 63 that is integral with the fixed end of the block body 42, a thinned section 64 that constitutes a fulcrum section 62 and a coupling member 65 that is jointed to a force point (a point where a force is applied) of the lever section 62.

The thinned section 64 that constitutes the fulcrum of the lever section 62 is formed between the fixed section 63 and the lever section 62. The other end of the coupling member 65 one end of which is jointed to the force point of the lever section 62 is coupled to a block at the movable end of the block body 42. A fixed coupling hole 66 that is used for coupling to the force sensor 41 is formed at the fixed section 63. An action point coupling section 67 that is coupled to the force sensor 41 is formed at an action point of the lever section 62.

The lever mechanism operates in the following manner:

When the movable end of the block body 42 transforms downward upon receiving a weight, the coupling member 65 is pulled down, and thus applying corresponding downward force to the force point of the lever section 62. As a result, upwardly transformed is the action point (the position of the action point coupling section 67) of the lever section 62 supported by the fulcrum (the thinned section 64).

Now let say the distance between the fulcrum and the force point is L1, the distance between the fulcrum and the action point is L2, the downward force that acts on the fulcrum is F1 and the upward force that acts on the action point is F2, there is the following relationship: L1×F1=L2×F2. This means that the force F1 that acts on the force point is applied to the action point by reducing by the factor of L1/L2.

Figure 4:
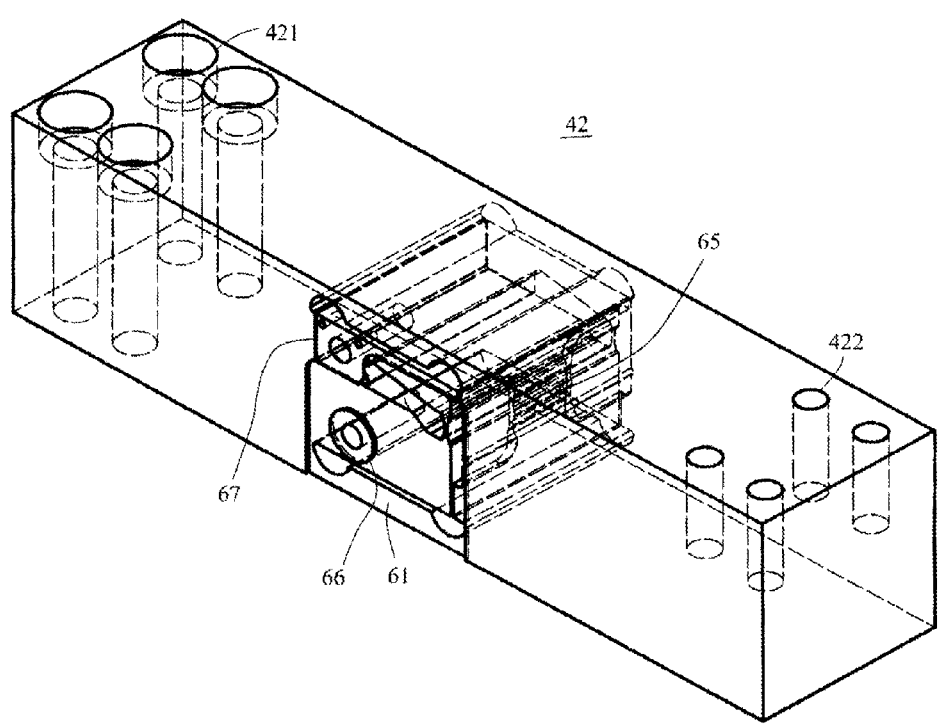
FIG. 4 illustrates an internal construction of the block body as shown in FIG. 2.
Figure 5:
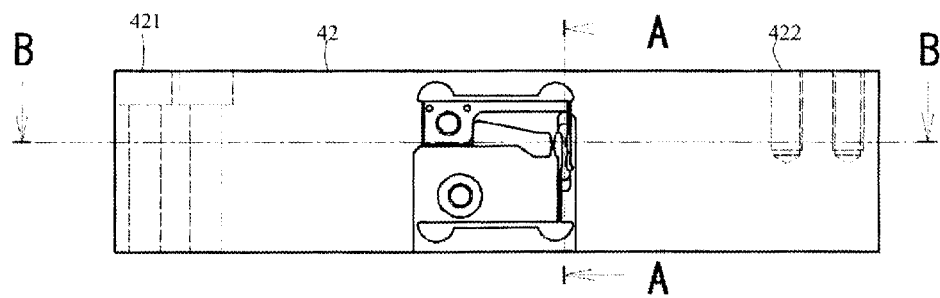
FIG. 5 is a side view of the block body as shown in FIG. 2.

FIG. 4 visually illustrates the lever mechanism and the Roberval mechanism inside the block body 42 as well as the bolt holes 421 and the screw holes 422. On the other hand, FIG. 6 is a cross section view of the block body 42 as shown in FIG. 5 along the line A-A (i.e., a vertical cross section view at the position of the coupling member 65), while FIG. 7 is a cross section view along the line B-B (i.e., a horizontal cross section view at the position of the fulcrum 64).

Figure 6:
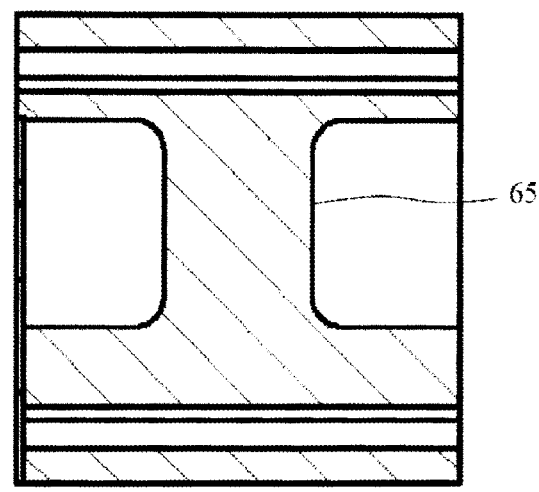
FIG. 6 is a cross section view of the block body along the line A-A in FIG. 5.
Figure 7:
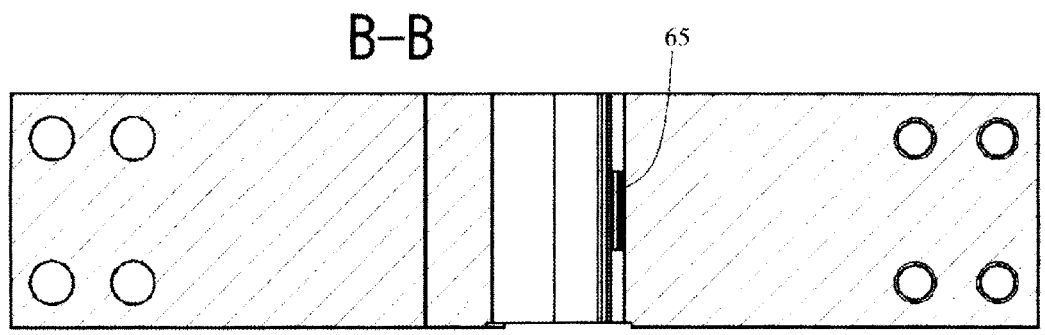
FIG. 7 is a cross section view of the block body along the line B-B in FIG. 5.

As understood from FIGS. 4, 6 and 7, the parallel rink sections 61, the lever section 62, the fixed section 63 and the thinned section 64 are formed to have the same width as the width of the rectangular parallelepiped member. However, the coupling member 65 is ground from the both opposed sides of the block body 42 by an equal length.

By providing the coupling member 65 that is jointed to the force point of the lever section 62 only near adjacent to the center portion in the width direction of the block body 42 as described hereinabove, even if the block body 42 may be twisted by a biased load, there is less effect of such twisting on the action point coupling section 67.

On the other hand, as shown in FIGS. 8 and 9, the force sensor 41 is formed by hollowing out a relatively thin single metal block and comprises a base section 71 that is coupled to the fixed section 63 of the block body 42, a force application section 73 that is coupled to the action point coupling section 67 of the lever section 62 of the block body 42, the lever section 75 acting as the lever, a coupling section 72 for jointing between the force application section 73 and the lever section 75, and a tuning fork vibrator 78.

The base section 71 is formed with a bolt hole 74 and a bolt 91 (see FIG. 1) inserted into the bolt hole 74 is mated with the fixed coupling hole 66 in the fixed section 63 of the block body 42 for coupling the base section 71 and the fixed section 63.

Also, the force application section 73 is formed with a bolt hole 79. A bolt 92 (see FIG. 1) inserted into the bolt hole 79 is mated with the action point coupling section 67 of the block body 42 for coupling the force application section 73 and the action point coupling section 67.

The coupling section 72 joints the force application section 73 and one end of the lever section 75. The base section 71 is jointed to the lever section 75 by way of a thinned section 77 that acts as the fulcrum of the lever section 75 and securely mounts one end of the tuning fork vibrator 78 by way of a thinned section 80. Also, the front end of the lever section 75 is jointed to the other end of the tuning fork vibrator 78 by way of a thinned section 81.

When a load F is applied to the movable section of the block body 42, a reduced force f equal to such loaf F multiplied by L1/L2 is transmitted from the action point coupling section 67 of the lever section 62 to the force application section 73, thereby pulling up the force application section 73. As a result, the coupling section 72 pulls up an end portion of the lever section 75 by the force f. The lever section 75 pulls down the thinned section 81 that is jointed to the tuning fork vibrator 78 by the force equal to the lever ratio of the lever having the thinned section 77 that is jointed to the base section 71 as the fulcrum. The tuning fork vibrator 78 changes its vibration frequency in response to the tensile force applied to the both ends thereof.

The change in vibration frequency of the tuning fork vibrator 78 is outputted after converting into a digital signal by a circuit fabricated on the circuit board that is accommodated in the sensor case 33.

Since the lever mechanism and the Roberval mechanism are fabricated inside the block body 42 in the load detection sensor 40 that is described hereinabove, the outer shape of the rectangular parallelepiped member is maintained despite the fact that it is worked by cutting and grinding at the side thereof. This means that it maintains sufficient mechanical strength. Consequently, even if the load transmitted from the bolts 37 may be large, it is possible to stably reduce the load and transmit the reduced load to the force sensor 41.

Again, the force sensor 41 of the load detection sensor 40 can precisely convert the load transmitted from the block body 42 into changes in vibration frequency of the tuning fork vibrator 78.

Additionally, since the coupling member 65 for jointing to the force point of the lever inside the block body 42 in the load detection sensor 40 is positioned near the center position in the width direction of the block body 42 by grinding both opposed sides of the block body 42, even if the block body 42 may be twisted by a biased load (i.e., by transmitting different magnitudes of load from the four bolts 37 mated with the four screw holes 422), it is possible to minimize any adverse effect of such twisting on the force sensor 41.

As a result, the use of this particular load detection sensor 40 makes it possible to detect the load in very high precision.

Figure 13:
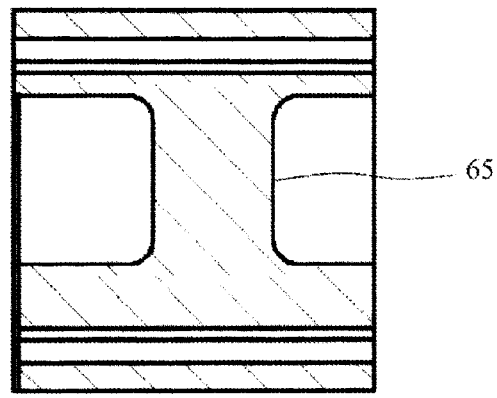
FIG. 13 is an alternative cross section view of the block body as shown in FIG. 2 along the line A-A.

It is to be noted that the location of the coupling member 65 inside the block body 42 is fabricated at the center position in the width direction of the block body 42 in FIG. 6, it is possible to compensate for developing a biased force by shifting to the opposite side of the force sensor 41 from the center position in the width direction of the block body 42 and mounting the force sensor 41 on the side of the block body 42 as shown in FIG. 13, thereby preventing the lever section 62 from twisting when a biased load is received.

Moreover, since the force sensor 41 is firmly secured on the side of the block body 42 in the load detection sensor 40, the height of the load detection sensor 40 does not increase beyond the height of the block body 42. This is particularly advantageous in order to reduce the height of the weighing table of the platform scale that employs such sensor 40.

It is to be noted that the load detection sensors according to the present invention are not only provided to users by assembling in platform scales but are also available to users in the form of the load detection units 30 as shown in FIG. 11. Users who acquire the load detection units 30 may place, for example, two load detection units 30 in parallel on a horizontal plate, thereby configuring a platform scale best suited to their working fields by simply placing a flat plate on the load detection units 30.

Industrial Applicability of the Invention

The load detection sensor according to the present invention ensures high precision weighing and finds wide applications for platform scales and similar weighing machines in various fields such as, for example, production fields in manufacturing plants, distribution fields, medical fields, education and research fields, agriculture and fishing fields, home uses and the like.

DESCRIPTION OF REFERENCE NUMERALS 10 upper frame
20 base frame
30 load detection unit
31 upper support member
32 component force damping device
33 sensor case
35 cover
37 bolts
41 force sensor
42 block body
43 bolts
51 diaphragm
52 mounting plate
53 clamping plate
61 parallel link section
62 lever section
63 fixed section
64 thinned section
65 coupling member
66 fixed coupling hole
57 action point coupling section
71 base section
72 coupling section
73 force application section
74 bolt hole
75 lever section
77 thinned section
78 tuning fork vibrator
79 bolt hole
80 thinned section
81 thinned section
91 bolt
92 bolt
351 hole
421 bolt hole
422 screw hole

What is claimed is:
1. A load detection sensor comprising:
a force sensor including a tuning fork vibrator; and
a block body having a rectangular parallelepiped outer shape and for transmitting an applied load to the force sensor by using a lever to reduce the load;
wherein the block body contains a lever mechanism and a Roberval mechanism formed from the block body and within the block body by cutting and grinding the block body on a longitudinal side, wherein the lever mechanism comprises:
  the lever,
  a coupling member for jointing a force point of the lever to a movable section of the block body,
  a thinned section coupled to a fixed section of the block body for supporting a fulcrum of the lever, and
  an action point coupling section formed at an action point of the lever;
wherein the force sensor comprises:
  the tuning fork vibrator,
  a base section couple to the fixed section of the block body for supporting one end of the tuning fork vibrator,
  a force application section to be coupled to the action point coupling section of the lever mechanism, and
  a lever section having a fulcrum supported to the base section for transmitting the force at the force application section to the other end of the tuning fork vibrator;
wherein the base section of the force sensor is coupled to the fixed section of the block body at the side of the longitudinal side of the block body, and
wherein the force application section of the force sensor is coupled to the action point coupling section of the lever mechanism at the side of the longitudinal side of the block body.

2. A load detection sensor of claim 1, wherein a coupling member for jointing to the force point of the lever inside the block body is formed near the center section in the width direction of the block body by grinding from both opposed sides of the block body.

\* \* \* \* \*